(12) United States Patent
Hartmann et al.

(10) Patent No.: US 9,776,801 B2
(45) Date of Patent: Oct. 3, 2017

(54) SYSTEM WITH TELESCOPIC CONVEYOR AND METHOD THEREFOR

(71) Applicants: Bernd Hartmann, Grafschaft-Leimersdorf (DE); Martin Henderson, Wallasey (GB)

(72) Inventors: Bernd Hartmann, Grafschaft-Leimersdorf (DE); Martin Henderson, Wallasey (GB)

(73) Assignees: Deutsche Post AG, Bonn (DE); Sovex Limited, Wirral (GB)

( * ) Notice: Subject to any disclaimer, the term of this patent is extended or adjusted under 35 U.S.C. 154(b) by 0 days.

(21) Appl. No.: 14/636,325

(22) Filed: Mar. 3, 2015

(65) Prior Publication Data

US 2015/0259149 A1    Sep. 17, 2015

(30) Foreign Application Priority Data

Mar. 11, 2014   (DE) .................. 10 2014 103 202

(51) Int. Cl.
*B65G 21/14*        (2006.01)
*B65G 13/12*        (2006.01)
*B65G 41/02*        (2006.01)

(52) U.S. Cl.
CPC ............. *B65G 21/14* (2013.01); *B65G 41/02* (2013.01)

(58) Field of Classification Search
CPC ....... B65G 21/14; B65G 41/008; B65G 13/12
(Continued)

(56) References Cited

U.S. PATENT DOCUMENTS

| 684,862 A | 10/1901 | Peters |
| 2,808,145 A | 10/1957 | Bergmann et al. |
| (Continued) | | |

FOREIGN PATENT DOCUMENTS

| CN | 1508054 A | 6/2004 |
| CN | 201331267 Y | 10/2009 |
| (Continued) | | |

OTHER PUBLICATIONS

PK Fördertechnik Fon, PK Fördertechnik Lexikon Transportband (PK Conveyor technology Conveyor belt), web information, 2009, 2 pages (3 pages including translation), DE.

(Continued)

*Primary Examiner* — Leslie A Nicholson, III
*Assistant Examiner* — Lester Rushin
(74) *Attorney, Agent, or Firm* — Reinhart Boerner Van Deuren P.C.

(57) ABSTRACT

A system has a telescopic conveyor 20 and at least one guiding element 40. The at least one guiding element 40 may be fixed at a location by means of securing components 43. The telescopic conveyor 20 can be moved in or counter to the conveying direction of the telescopic conveyor 20 from a parking position into an operating position, with the telescopic conveyor 20 being guided by the at least one guiding element 40, in order to allow operation of the telescopic conveyor 20. The telescopic conveyor 20 can be moved in or counter to the conveying direction of the telescopic conveyor 20, with the telescopic conveyor 20 being guided by the at least one guiding element 40, from an operating position into a parking position in order to clear a space which is occupied by the telescopic conveyor 20 in the operating position.

18 Claims, 7 Drawing Sheets

(58) Field of Classification Search
USPC .................. 198/313, 588, 594, 595, 812
See application file for complete search history.

(56) References Cited

U.S. PATENT DOCUMENTS

| | | | | |
|---|---|---|---|---|
| 3,633,879 | A | * | 1/1972 | Prichard ............... B28C 5/4255 366/68 |
| 3,780,843 | A | | 12/1973 | McGovern, Jr. et al. |
| 5,351,809 | A | | 10/1994 | Gilmore et al. |
| 5,366,068 | A | * | 11/1994 | Hall ....................... B65G 21/14 198/313 |
| 5,685,416 | A | | 11/1997 | Bonnet |
| 6,484,862 | B1 | | 11/2002 | Gilmore et al. |
| 7,168,555 | B2 | * | 1/2007 | Peterson ............... B65G 43/00 198/588 |
| 7,416,075 | B2 | * | 8/2008 | Haustein ............... B65G 13/12 198/588 |
| 2008/0035453 | A1 | | 2/2008 | Haustein et al. |
| 2011/0076115 | A1 | * | 3/2011 | Page ....................... D06F 95/00 414/13 |

FOREIGN PATENT DOCUMENTS

| | | |
|---|---|---|
| CN | 101955068 A | 1/2011 |
| CN | 102295134 A | 12/2011 |
| CN | 202467736 U | 10/2012 |
| CN | 202 609 477 U | 12/2012 |
| CN | 103025630 A | 4/2013 |
| CN | 203020988 U | 6/2013 |
| DE | 4111740 A1 | 10/1992 |
| DE | 44 19 113 C1 | 1/1996 |
| DE | 29801791 U1 | 5/1998 |
| DE | 102004063704 B4 | 6/2007 |
| DE | 10 2010 005 267 A1 | 7/2011 |
| EP | 1 426 312 A1 | 6/2004 |
| EP | 1 826 154 A1 | 8/2007 |
| EP | 2 243 728 A2 | 10/2010 |
| JP | 51-115377 | 9/1976 |
| JP | 2010 242382 A | 10/2010 |
| WO | WO 2012/049445 A1 | 4/2012 |

OTHER PUBLICATIONS

Budde Fördertechnik GMBH, TGF telescopic belt conveyor, The Most Profitable Link Between Transport and Warehouse Logistics, web information, 6 pages (12 pages including translation), DE.

* cited by examiner

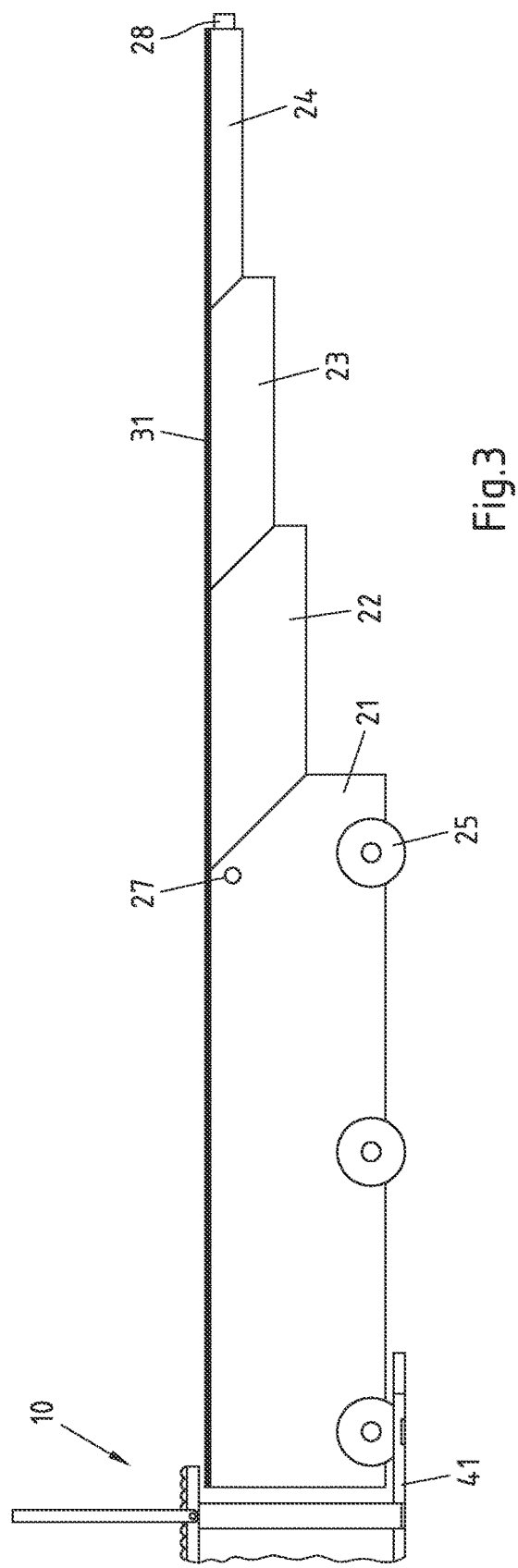
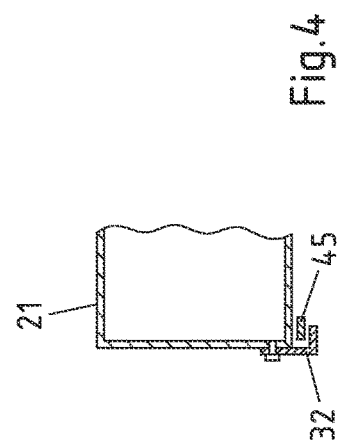
Fig.3
Fig.4

SYSTEM WITH TELESCOPIC CONVEYOR AND METHOD THEREFOR

CROSS-REFERENCE TO RELATED PATENT APPLICATIONS

This patent application claims priority to German Application No. 10 2014 103 202.0, filed Mar. 11, 2014, the entire teachings and disclosure of which are incorporated herein by reference thereto.

FIELD OF THE INVENTION

The present invention relates to a system comprising a telescopic conveyor and a method for such a system.

BACKGROUND OF THE INVENTION

Telescopic conveyors are known in practice for a large number of application fields. They may be constructed in particular as telescopic belt conveyors but, for example, also as telescopic roller conveyors.

A telescopic conveyor enables the bridging of variable distances on a transport path of unit loads. The telescopic conveyor may to this end comprise a carrier frame and at least one telescopic segment which is supported in the carrier frame so as to be able to be moved in a telescope-like manner. In a telescopic conveyor, it is then possible to fit a conveyor belt by means of redirection rollers, tension rollers and drive rollers to the carrier frame and the telescopic segments in such a manner that, with different deployment stages of the telescopic segments, there is in each case a continuous, tensioned and drivable transport belt available for transporting unit loads. A corresponding arrangement is described, for example, in the Patent Specification DE 10 2004 063 704 B4.

Unit loads may, for example, be provided from a sorting installation at a fixed location in order to be moved onto the loading area of a lorry or a trailer. Even if the access to the loading area is located substantially directly in front of a discharge location of the sorting installation, there may be slight differences in the distance between the discharge location and the loading area. Furthermore, regions further towards the back generally have to be loaded first on the loading area and then regions further towards the front. The same applies accordingly when unit loads are intended to be unloaded from the loading area of a lorry or trailer and supplied to a fixed conveying arrangement for further transport. Owing to the telescopic properties of a telescopic conveyor, such different distances can be bridged with a single telescopic conveyor. Using telescopic conveyors, consequently, the conveying of unit loads can be accelerated and the operators may be under less strain during loading and unloading operations.

SUMMARY OF THE INVENTION

One of the objects of the invention is to enable an even more flexible use of telescopic conveyors.

The object is achieved with a system according to claim 1 and a method according to claim 15. Other embodiments are set out in the dependent claims.

An embodiment of a system according to the invention comprises a telescopic conveyor and at least one guiding element. The at least one guiding element comprises securing components which are configured to fix the at least one guiding element at a location. The telescopic conveyor and the at least one guiding element are further configured to cooperate with each other in such a manner that the telescopic conveyor is movable, guided by the at least one guiding element, in and/or counter to the conveying direction of the telescopic conveyor between a parking position and an operating position of the telescopic conveyor when the at least one guiding element is fixed at a location by means of the securing elements.

An embodiment of a method according to the invention for using a system comprises the following actions, wherein the system comprises a telescopic conveyor and at least one guiding element and the at least one guiding element is fixed at a location by means of securing components: moving the telescopic conveyor in or counter to the conveying direction of the telescopic conveyor from a parking position into an operating position with the telescopic conveyor being guided by the at least one guiding element in order to enable operation of the telescopic conveyor and moving the telescopic conveyor in or counter to the conveying direction of the telescopic conveyor from an operating position into a parking position with the telescopic conveyor being guided by the at least one guiding element in order to clear a space which is occupied by the telescopic conveyor in the operating position.

The invention is based on the consideration that in some installations telescopic conveyors may serve a useful purpose in certain situations but are not used continuously. In this instance, the telescopic conveyors may under some circumstances impair the operation of the installation or occupy space that could be used for other purposes.

It would thus be possible for a supply arrangement of an installation to provide at specific times a relatively large quantity of unit loads which are intended to be moved continuously into a specific trailer in each case. This could advantageously be carried out using a telescopic conveyor. At other times, the same supply arrangement could supply unit loads, of which a respective smaller quantity is intended to be moved into different trailers. In this instance, it could be more effective for operators to load the unit loads for each trailer into a rolling container, to push it towards the trailer and to unload it at that location. With such or similar changing use of a supply arrangement, a telescopic conveyor which is permanently arranged in front of the supply arrangement could make it more difficult to use the supply arrangement without a telescopic conveyor.

The invention therefore makes provision for specific exemplary embodiments that a telescopic conveyor can be moved between a parking position and an operating position in the conveying direction of the telescopic conveyor. The movement in this instance may be guided by at least one locally fixed guiding element. Owing to the guiding of the movement between the parking position and the operating position, the at least one guiding element can facilitate the movement, particularly in a tight space, for example, by preventing tilting of the telescopic conveyor. Furthermore, damage to the telescopic conveyor and other installation components can be prevented since, with fixedly predetermined movement patterns, collisions can be prevented. The parking position can then always be assumed when the telescopic conveyor is not required so that the space occupied by the telescopic conveyor in the operating position can be used for other purposes. At the same time, the telescopic conveyor can move at any time rapidly and simply into the operating position when it is desirable to use the telescopic conveyor. The term conveying direction is intended to be understood to be the main conveying direction of the telescopic conveyor permitted by the telescopic conveyor. That is to say, if the telescopic conveyor can be pivoted, the permitted conveying direction without pivoting is meant. In exemplary embodiments, the telescopic conveyor may be able to be operated for various situations of use with opposing conveying directions. However, in other exemplary embodiments, the telescopic conveyor may also be able to be operated only with one conveying direction. That is to say, when the operating position is reached from the parking position in the latter case through a movement in the conveying direction, the parking position is reached from the operating position by means of a movement counter to the conveying direction and vice versa.

The at least one guiding element, when it is fixed in position, together with the telescopic conveyor, may define the parking position and optionally the operating position. Of course, such an operating position in exemplary embodiments could be only one of many possible operating positions.

The telescopic conveyor may, for example, be a telescopic belt conveyor. Telescopic belt conveyors may also be referred to as telescopic band conveyors. However, in place of a conveyor belt or conveyor band, it is also possible to provide a different type of conveying technology for the telescopic conveyor.

The provided parking position of the telescopic conveyor may, for example, be located under a fixed conveying unit of an installation. It may, however, for example, also be located at a specific distance from the end of a fixed conveying unit so that a free space is provided in front of the conveying unit and the end of the conveying unit can be used in a flexible manner for other types of removal or supply.

The telescopic conveyor may be configured to be movable in different manners. The telescopic conveyor could, for example, comprise wheels. In place of wheels, the telescopic conveyor could have, for example, rollers which are supported at the lower side thereof and on which the telescopic conveyor can be moved.

In an exemplary embodiment of the system, the telescopic conveyor comprises wheels and the at least one guiding element comprises at least one rail for guiding the telescopic conveyor. Optionally, but not necessarily, the at least one rail could specifically guide at least one of the wheels. To this end, a rail and at least one wheel could be constructed to be adapted to each other in any desired manner. The rail could, for example, have a groove in which the wheel is guided. However, the wheel could also have a groove along the periphery and be guided by means of the groove by a web-like rail. The telescopic conveyor could also have wheels at the right and left-hand side and two simple rails at the outer side of the wheels or at the inner side of the wheels, respectively, could guide the telescopic conveyor during a movement between the different positions.

A portion of the rails could also be extendible in order to completely limit the possible movement path up to an operating position.

In place of rails, however, it would also be possible to use other guiding elements. For example, a frame with side walls which can be installed in a fixed manner or a housing which can be installed in a fixed manner could be provided, the side walls of the frame or the housing then being able to act as guiding elements. Such a construction with side walls may have the effect that lateral portions of the telescopic conveyor are also partially covered during movements between the parking position and the operating position. It is thereby possible, on the one hand, for the risk of injury to be reduced and, on the other hand, for the possibilities to be reduced of objects unintentionally getting into the path of the telescopic conveyor in regions which may be difficult to access.

In an exemplary embodiment of the system, the telescopic conveyor comprises a guiding wheel which can be guided by the at least one guiding element. The provision of a guiding wheel may have the effect that it can be implemented in a particularly simple manner. The guiding wheel could, for example, be arranged in a rear region of the telescopic conveyor. This may have the effect that the actual telescopic conveyor can be moved, guided by the at least one guiding element, as far as a location in front of the at least one guiding element. The guiding wheel could additionally or alternatively, for example, be arranged centrally relative to the telescopic conveyor. This may have the effect that a linear guiding using simple means is enabled. The guiding wheel could additionally or alternatively, for example, be orientated horizontally. This may have the effect that the guiding can be carried out independently of the movement of wheels, on which the telescopic conveyor could be moved between the various positions. The guiding wheel could additionally or alternatively, for example, be guided between two rails which act as the at least one guiding element. This may have the effect that the movement of the telescopic conveyor is limited in a reliable manner at two sides.

In an exemplary embodiment of the system, the telescopic conveyor has means for height adjustment of a front end of the telescopic conveyor, with a height of a rear end of the telescopic conveyor being maintained. This may have the effect that the front end of the telescopic conveyor, even with a generally very low construction of the telescopic conveyor, can be moved to an ergonomically advantageous height for operation. The means in this instance may comprise, for example, at least one hydraulic cylinder. However, the means could also be constructed in any other manner, for instance, in the form of a manually operable lifting device with a tooth and pinion jack, or the like.

The telescopic conveyor could be moved by hand by operating personnel for a change between a parking position and an operating position, that is to say, in particular pulled or pushed. To this end, in an exemplary embodiment, at least one handle could be provided on the telescopic conveyor.

However, in another exemplary embodiment, the telescopic conveyor comprises wheels and at least one motor for driving at least one of the wheels and the system comprises at least one control unit which is configured to control the at least one motor in response to a user input. The movement of the telescopic conveyor can thereby be configured in a particularly simple manner for the operators. The control unit may be an integral component of the telescopic conveyor or be arranged outside the telescopic conveyor. The control unit may comprise hardware and/or software. The control unit may, for example, comprise an electronic circuit. The control unit may, for example, comprise at least one processor and at least one memory which is connected to the processor. The memory may comprise programme instructions and the processor may be configured to carry out programme instructions from the memory in order to cause the system to carry out specific actions. The control unit may, for example, be a computer. For the user input, any user interface may be provided, such as buttons, controllers and/or a touch screen.

In an exemplary embodiment, the system comprises at least one component for mechanical limitation of the movement of the telescopic conveyor beyond the parking position and/or the operating position. By ensuring that the telescopic conveyor cannot be moved beyond the parking position, damage to components which are arranged behind the parking position can be prevented. Furthermore, the telescopic conveyor can thus be prevented from being no longer readily accessible where applicable. By ensuring that the telescopic conveyor cannot be moved beyond the operating position, it can, for example, be ensured that the telescopic conveyor is always in an optimum operational connection with other conveying elements. If the telescopic conveyor is, for example, used together with a supply arrangement, a gap between the supply arrangement and the telescopic conveyor may be prevented, in which gap relatively small unit loads could fall or unit loads could become jammed.

In an exemplary embodiment, the system comprises at least one sensor which is arranged to detect that a parking position and/or an operating position of the telescopic conveyor has been reached. The sensor can be used in place of mechanical limitation or together with a mechanical limitation of the movement.

The sensor may indicate the reaching of a parking position and/or an operating position, for example, to a control unit. To this end, the sensor can transmit all measurement values to the control unit or it may, for example, transmit a signal to the control unit only when a predetermined limit value has been exceeded. The control unit may, for example, be configured to cause a motor which is used for the movement of the telescopic conveyor to stop when it is indicated that a desired position has been reached. If, in contrast, the telescopic conveyor is intended, for example, to be moved by hand between the positions, the reaching of a parking position and/or an operating position of the telescopic conveyor, which is detected by a sensor, could lead to an acoustic and/or optical signal for the operator brought about by the control unit.

The sensor may be freely selected and arranged as long as the sensor and arrangement are suitable for the provided purpose. It may thus be a sensor which detects the torque of a motor which could exceed a predetermined limit value when the telescopic conveyor has reached a mechanical limitation element. Alternatively, it may be a photosensor, which is arranged on the telescopic conveyor, a guiding element or separately from both. A photosensor could, for example, take a two-dimensional image and a control device could verify whether a current image or a cut-out thereof corresponds to a predetermined image. The predetermined image may be an image which is taken beforehand on an installed system, or an image of a marking, which has been fitted at a predetermined location to a guiding element and/or the telescopic conveyor. A photosensor could alternatively be a photodiode, which detects direct or reflected light from a suitably arranged light source when a specific position has been reached.

In an exemplary embodiment, the system comprises at least one retention arrangement for retaining the telescopic conveyor in the parking position and/or in the operating position of the telescopic conveyor. Undesirable movement of the telescopic conveyor out of the position reached can thereby be prevented or made more difficult. If the telescopic conveyor comprises wheels, the retention arrangement may, for example, comprise a parking brake or other arresting means which can be actuated manually or electrically. Alternatively, the guiding elements could, for example, provide a type of threshold for at least one of the wheels which can readily be traveled over for an intentional movement but which provides a degree of resistance to an unintentional movement from a reached target position. Further alternatively, in particular in the operating position, height adjustable supports which are fitted in the telescopic conveyor could be extended. The extension may in this instance be carried out manually or by means of a motor. Such supports could also be deployed to such an extent that at least a portion of the wheels provided loses contact with the ground. Optionally, the telescopic conveyor may also be moved in the operating position by means of such supports to a suitable height to enable a planar transition to other conveying units.

In an exemplary embodiment of the system, the telescopic conveyor and the at least one guiding element comprise cooperating components for stabilising the telescopic conveyor when the telescopic conveyor is operated in an operating position. If the parking position of the telescopic conveyor is, for example, below a conveying arrangement, the possible height of the telescopic conveyor is limited. In order to nonetheless be able to achieve a specific length in the extended state using a plurality of telescopic segments, comparatively thin and consequently light materials have to be used. In order to prevent tilting of the telescopic conveyor when heavy unit loads arrive in the front region of the extended telescopic conveyor, a counter-weight may be arranged in the rear, lower region of the telescopic conveyor for stabilisation. Additionally or alternatively, however, components of the telescopic conveyor could also cooperate in the operating position in an appropriate manner with complementary components of the guiding elements which are fixed in position in order to stabilise the telescopic conveyor.

In an exemplary embodiment, the system further comprises a conveying arrangement of a fixed installation, with the at least one guiding element being fixed below the conveying arrangement by means of the securing components in such a manner that the telescopic conveyor in its parking position is located at least for the most part below the conveying arrangement. That is to say, more than half of the telescopic conveyor is located below the conveying arrangement, preferably more than two thirds, more preferably more than three quarters. If a small portion of the telescopic conveyor is not located below the conveying arrangement, some operating elements of the telescopic conveyor could be more readily accessible. The larger the portion of the telescopic conveyor that is located below the conveying arrangement, however, the more space is gained in front of the conveying arrangement if the telescopic conveyor is not required. In some exemplary embodiments, the telescopic conveyor in the parking position is therefore located completely below the conveying arrangement.

In an exemplary embodiment, the at least one guiding element comprises at least one rail which is fixed centrally below the conveying arrangement and which extends along the conveying direction of the conveying arrangement. The at least one rail could, for example, also be a rail pair which is fixed as a unit centrally below the conveying arrangement. Of course, however, rails or other guiding elements do not necessarily have to be fixed centrally below the conveying arrangement; they could, for example, also be fixed close to the edge below the conveying arrangement.

In an exemplary embodiment of the system, the telescopic conveyor is located in the operating position thereof at least for the most part in front of the conveying arrangement. The conveying arrangement could then have a first conveying height which is higher than a conveying height of the telescopic conveyor in the operating position thereof in a region adjoining the conveying arrangement. The conveying arrangement could further have a front end which can be lowered to a second conveying height which corresponds to the conveying height of the telescopic conveyor in the region adjoining the conveying arrangement. This could have the effect that a substantially planar transition between the conveying arrangement and the telescopic conveyor can be achieved so that conveyed unit loads do not have to overcome any steps.

In order to support the lowering action, the conveying arrangement could, for example, comprise at least one actuator, and the front end of the conveying arrangement could be able to be lowered to the second conveying height by means of the actuator. The actuator could then also be used to move the front end of the conveying arrangement to the first height again when the telescopic conveyor has not been used at the moment. Alternatively to an actuator, however, for example, a purely mechanical adjustment mechanism which can be actuated by hand could also be provided.

The fixed installation may, for example, be a sorting installation and/or an encoding installation. The conveying arrangement may, for example, comprise a supply arrangement. The supply of unit loads supported by the supply arrangement may in this instance include supply from the installation and/or into the installation. Such a sorting or encoding installation could, for example, be provided for sorting and/or encoding of parcels or letters. Other fixed installations having at least one conveying arrangement could, for example, be production installations in which end or intermediate products are produced and provided for further transport.

Other advantageous exemplary embodiments of the invention can be taken from the following detailed description of some exemplary embodiments of the present invention, in particular together with the Figures. However, the Figures are intended only for the purposes of explanation, but not to determine the protective scope of the invention. The Figures are not drawn to scale and are intended only to illustrate the general concept of the present invention by way of example. In particular, features which are contained in the Figures, are in no way intended to be considered to be an absolutely necessary component of the present invention.

BRIEF DESCRIPTION OF THE DRAWINGS

In the drawings:

FIG. 3 is a schematic illustration of an exemplary embodiment of a system according to the invention with a telescopic conveyor in an operating position.

FIG. 4 is a sectioned view of a cut-out of an exemplary embodiment of a system according to the invention.

DETAILED DESCRIPTION OF THE INVENTION

The present invention is described below with reference to exemplary embodiments, which enable flexible use of a telescopic conveyor.

Figure 1:
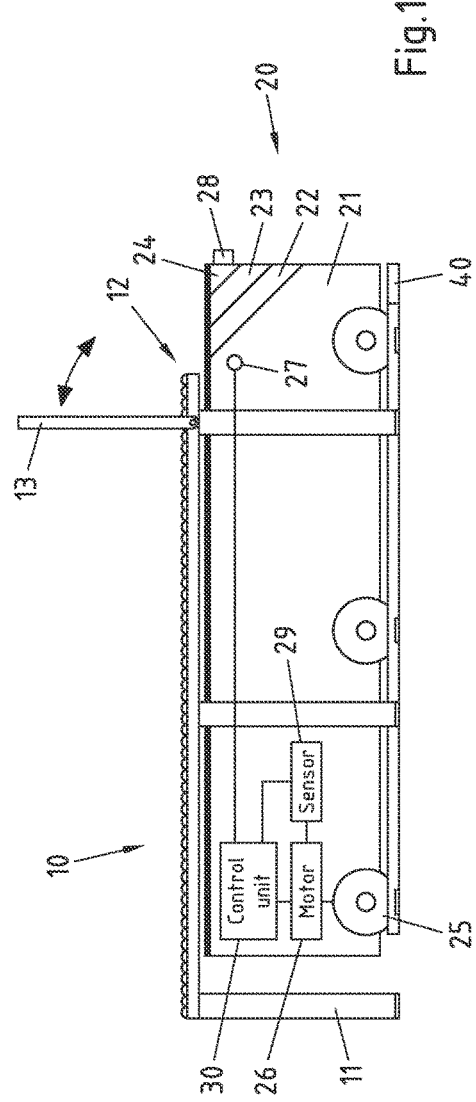
FIG. 1 is a schematic illustration of an exemplary embodiment of a system according to the invention with a telescopic conveyor in a parking position.

FIG. 1 is a schematic illustration of a first exemplary embodiment of a system according to the invention.

The system comprises at least one telescopic belt conveyor and guiding elements which are associated with the at least one telescopic belt conveyor. The telescopic belt conveyors are, for example, used in a parcel sorting installation.

The sorting installation comprises various conveying arrangements, inter alia a plurality of roller conveyors as exemplary supply arrangements. The sorting installation detects the addresses which are written on the parcels and guides them by means of various conveying units to one of the roller conveyors which is provided for the address detected. The sorting installation may also perform other functions, such as weighing the parcels, encoding the parcels based on detected addresses, etc. At least in front of some of the roller conveyors, a trailer may be parked in which the parcels provided by the respective roller conveyor are intended to be further conveyed by means of a semi-trailer truck. The floor of the entire installation could, for example, have a height of 1.2 m which corresponds to the conventional height of the storage space floor of trailers. The roller conveyors may then terminate on or in front of a correspondingly high loading ramp so that there is produced from the loading ramp a substantially planar transition to the storage space floor of a trailer located in front of the loading ramp.

FIG. 1 now shows one of these roller conveyors 10 by way of example. The roller conveyor 10 has a specific height, for example, a height which in an ergonomically advantageous manner enables an operator to take down incoming parcels and to move them into a roller container. The roller conveyor 10 may to this end have suitably high lateral supports 11 which may be anchored securely in the ground and which leave a free space below the roller conveyor 10.

FIG. 1 further shows a telescopic belt conveyor 20 having associated guiding elements 40.

The telescopic belt conveyor 20 comprises a carrier frame 21 and a plurality of telescopic segments 22, 23, 24 which can be extended in a telescopic manner. The telescopic belt conveyor 20 is shown in FIG. 1 in the pushed-together state in a parking position below the roller conveyor 10.

The telescopic belt conveyor 20 comprises a plurality of wheels 25 which are mounted at both sides of the carrier frame 21. There could thus be assembled below the carrier frame 21 a plurality of axles which each retain a pair of wheels 25 at the two ends thereof. The wheels 25 are fitted in such a manner that the telescopic belt conveyor 20 can be moved rolling on the wheels 25 in the longitudinal direction of the carrier frame 21. Optionally, the wheels 25 are fitted in such a manner that they also enable movements in other directions. The telescopic belt conveyor 20 further comprises a motor 26 which can drive at least one of the wheels 25 by means of a gear both in the forward and in the backward direction. For example, the motor 26 could to this end drive via the gear a rotating axle, to which the rearmost pair of wheels is fitted, whilst the other axles could be fixed or rotating axles. However, it is self-evident that one or more motors could drive one or more of the wheels in various other manners.

The telescopic belt conveyor 20 further comprises other motors (not shown) for retracting and extending the telescopic segments 22, 23, 24 and optionally for hydraulic height adjustment and for pivoting the telescopic belt conveyor 20.

The telescopic belt conveyor 20 further comprises operating elements 27, 28 and a sensor 29. The operating elements 27, 28 may allow the operators inter alia to bring about a movement of the telescopic belt conveyor 20 into the parking position or into an operating position. They may also allow the operators to bring about a retraction and extension of the telescopic segments 22, 23, 24, a height adjustment and/or a pivoting of the telescopic belt conveyor 20. They may also allow the operators to bring about a start and a stoppage of band operation of the telescopic belt conveyor 20 or an emergency stop of any movement of the telescopic belt conveyor 20. The sensor 29 may be provided to register that a parking and/or an operating position has been reached. It may be constructed in different manners. For example, it could be associated with the motor 26 and detect the torque which is applied thereby.

The telescopic belt conveyor 20 further comprises a control unit 30. The control unit 30 may, for example, comprise at least one processor and at least one memory. The processor can be configured to carry out programmes which are stored in the memory and thereby to cause the telescopic belt conveyor 20 to carry out desired actions. The control unit 30 is connected, on the one hand, to the motor 26 and, on the other hand, to at least one of the operating elements 27, 28. In addition, the control unit 30 may be connected to the additional motors and the sensor 29.

The control unit 30 could also be connected to a radio receiver or a radio-based transmission/receiving device of the telescopic conveyor 20 (not illustrated) for a wireless communication with a control unit outside the telescopic conveyor 20. In this instance, it could be, for example, a control unit having a user interface for the roller conveyor 10 of the sorting installation so that the operator could input at least some control commands for the roller conveyor 10 and for the telescopic belt conveyor 20 at a central unit. Of course, a portion of the communication and control connections within the telescopic belt conveyor 20 could also be implemented in a wireless manner. It is further self-evident that a connection to an external control unit could also be wired. Corresponding lines could, for example, be laid together with a line for the power supply of the telescopic belt conveyor 20 in such a manner that impairment of the movement of the telescopic belt conveyor 20 is avoided and that an interruption of the lines by a movement of the telescopic belt conveyor 20 is prevented, respectively.

In the parking position illustrated in FIG. 1, the greater portion of the telescopic conveyor 20 is located below the roller conveyor 10. However, a small front portion protrudes by way of example. Operating elements 27, 28 in the front region of the telescopic belt conveyor 20 are thereby also readily accessible in the parking position. When the roller conveyor 10 is used without any telescopic conveyor 20, the protruding portion of the telescopic conveyor 20 could be bridged by means of a folding table 13 which is fitted at the removal side 12 of the roller conveyor 10.

The guiding elements 40 are fitted in a fixed manner below the roller conveyor 20, define a parking and an operating position of the telescopic conveyor 20 and guide the telescopic conveyor 20 during a movement between these positions.

Figure 2:
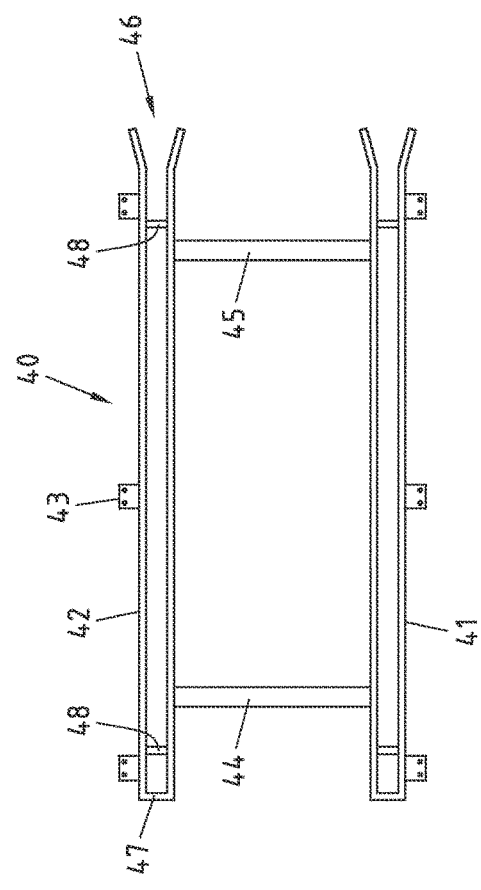
FIG. 2 is a plan view of an exemplary embodiment of guiding elements.

FIG. 2 is a schematic plan view of exemplary guiding elements 40.

Two guide rails 41, 42 are provided in this instance as guiding elements 40. Each of the guide rails 41, 42 forms, for example, a groove as a guiding device for the wheels 25 at a side of the telescopic conveyor 20 in each case. The guide rails 41, 42 have securing elements 43, for example, angular securing members, with which they can be screwed to the floor. Other manners of securing are also possible. The guide rails 41, 42 have a specific spacing with respect to each other which is predetermined by the spacing of the wheels 25 of the telescopic conveyor 20. In order to simplify assembly, spacers 44, 45 may be provided between the guide rails 41, 42.

The guide rails 41, 42 have a length which may, for example, be slightly shorter than the length of the carrier frame 21 of the telescopic conveyor 20, which substantially corresponds to the length of the telescopic conveyor 20 when pushed together. They could be arranged in such a manner that the front end 46 thereof at the removal side 12 of the roller conveyor 10 protrudes slightly below the roller conveyor 10. When the telescopic conveyor 20 is located in the parking position, the rear ends 47 of the guide rails 41, 42 could terminate with the rear wheels 25 of the telescopic conveyor 20 and the front ends 46 of the guide rails 41, 42 could terminate flush with the front portion of the telescopic conveyor 20. However, if there is provision for the telescopic conveyor 20 to be completely stored below the roller conveyor 10 in the parking position, it could be advantageous to allow the guide rails 20 to protrude slightly further.

The grooves formed by the guide rails 41, 42 could be closed at the rear at the rear end 47 of the guide rails 41, 42 so that the telescopic conveyor 20 cannot be rolled beyond the provided parking position. This closure 47 is consequently an exemplary mechanical limitation of the movement of the telescopic conveyor 20 beyond the parking position.

The grooves formed by the guide rails 41, 42 could expand slightly at the front end 46 of the guide rails 41, 42 in order to facilitate a first introduction of the wheels 25 of the telescopic conveyor 20 in the guide rails 41, 42.

FIG. 3 is another schematic illustration of the exemplary embodiment of the system according to the invention.

In FIG. 3, the same components of the system are shown as in FIG. 1, but in a different situation. In FIG. 3, the telescopic belt conveyor 20 is shown in the operating position thereof in front of the roller conveyor 10 and furthermore with completely extended telescopic segments 22, 23, 24. The telescopic conveyor 20 comprises a continuous conveyor belt 31 which is guided over various rollers in such a manner that, in various extension stages of the telescopic segments 22, 23, 24, it is available at the upper side of the telescopic belt conveyor 20 over the respective length of the telescopic belt conveyor 20 under tension and drivable for conveying parcels. For driving the conveyor belt 31, the telescopic belt conveyor 20 may comprise an additional motor (not illustrated). By way of example, only one direction of convey is provided for, from the end of the telescopic belt conveyor 20 adjoining the roller conveyor 10 to the opposing end of the telescopic segment 24. In an alternative embodiment, however, the direction of convey could also be reversible.

The length of the carrier frame 21, and consequently the minimum conveying length, could, for example, be in the range of from 4-5 m. The length of the telescopic belt conveyor 20 in the completely extended state shown in FIG. 3 and consequently the maximum conveying distance could, for example, be in the range from 12-15 m. Of course, these are only exemplary ranges. Both the minimum conveying distance and the maximum conveying distance could also be outside of the range given in each case. Furthermore, it is possible to use more or fewer than three telescopic segments.

The extended telescopic belt conveyor 20 illustrated in FIG. 3 has a substantially horizontal conveying face at the minimum height. The advantageous minimum height is predetermined by various parameters. It should be so high that the telescopic belt conveyor 20 for movement into the parking position fits precisely below the roller conveyor 10 so that there is no great height difference between the upper side of the roller conveyor 10 and the upper side of the telescopic belt conveyor 20. The roller conveyor 10 in turn should not be excessively high so as to enable the operator to readily remove parcels even without using the telescopic belt conveyor 20. An advantageous minimum height of the conveyor belt of the telescopic belt conveyor 20 could be between 0.5 m and 1 m. With a hydraulic height adjustment, a maximum height of the end of the conveyor belt with the telescopic belt conveyor 20 fully extended could then be provided in the range from 1 m to 1.5 m. Of course, these are again only exemplary ranges. Both the minimum height and the maximum height could also be outside the range given in each case.

FIG. 4 is a schematic sectioned view through the rear portion of the telescopic belt conveyor 20 and the front spacer 45 of the guiding elements 40.

The front spacer 45 could be fitted in a slightly raised position above the floor. The telescopic belt conveyor 20 could then have in the rear region a component 32 (which is fitted only in the parking position) which protrudes beyond the lower side of the carrier frame 21 in the direction of the floor and which is angled over the floor towards the front side of the telescopic belt conveyor 20. The component 32 could have a spacing with respect to the floor which ensures that the component 32 when the operating position of the telescopic belt conveyor 20 is approached moves into engagement with the front spacer 45. It is thereby possible, on the one hand, to provide an exemplary mechanical limitation of the movement of the telescopic conveyor 20 beyond the operating position. On the other hand, additional stabilisation of the telescopic conveyor 20 during operation in the extended state can thereby be achieved.

The rear spacer 44 from FIG. 2 could in contrast be fitted, for example, slightly above the floor. The component 32 could then have a spacing from the floor which further ensures that the component 32, when the parking position of the telescopic belt conveyor 20 is approached, slides over the rear spacer 44. On the other hand, it would also be possible to dispense with a closure of the grooves at the rear end 47 of the guide rails 41, 42 when the rear spacer 44 is arranged right at the rear end of the guide rails 41, 42 at a height which ensures that the telescopic belt conveyor 20 is stopped by the angular member 32 when the parking position is approached.

Regardless of the type of mechanical limitations, a sensor 29 could be configured to measure the torque applied by the motor 26 and to transmit to the control unit 30 a signal when the torque exceeds a predetermined threshold value. The control unit 30 may be configured to switch off the motor 26 when it receives such a signal since it can then be assumed that the desired position in each case has been reached, or that another, unforeseen problem has arisen.

An undesirable movement of the telescopic belt conveyor 20 from the parking position reached or the operating position reached could be prevented by the driven wheels 25 being blocked by the motor 26. Alternatively or additionally, however, a small elevation 48 could be provided in the grooves which is readily overcome when driven by the motor 26, but which otherwise makes unintentional displacement of the telescopic belt conveyor 20 more difficult.

The motor 26 or the combination of the elevations 48 with the closed ends 47 of the grooves and the combination of the elevations 48 with the angular member 32 form exemplary retention arrangements in order to retain the telescopic belt conveyor 20 in the parking position reached or in the operating position reached.

The system from FIGS. 1 to 4 may be modified in various manners, both by omitting components and by adding components. Additional or alternative advantages may thereby be provided.

The parcel sorting installation or individual components of the installation, in particular the roller conveyor 10 which is associated with the at least one telescopic belt conveyor 20 may optionally be a part of an embodiment of the system according to the invention.

In specific embodiments, the guide rails 41, 42 could also be secured in a manner different from being screwed to the floor. In specific embodiments, the guide rails 41, 42, instead of being secured to the floor, could further also be secured, for example, to the supports 11 of the roller conveyor 10. Particularly simple assembly and simple refitting may thereby be enabled when the guide rails 41, 42 are intended to be associated with another roller conveyor of the same or another installation.

In place of a sensor 29 which monitors the torque of the motor 26, any other type of sensor could also be arranged in such a manner that it can detect predetermined positions of the telescopic conveyor 20 relative to the guiding elements 40. Such a sensor could, for example, be constructed in a similar manner to a reflection based photoelectric barrier. It could be fitted to the telescopic conveyor 20, transmit a light beam and detect a reflected light beam, the light beam only being able to be reflected when the sensor is located directly over a position of the guiding elements 40 to which a reflector which is provided for this purpose is fitted.

Figure 5:
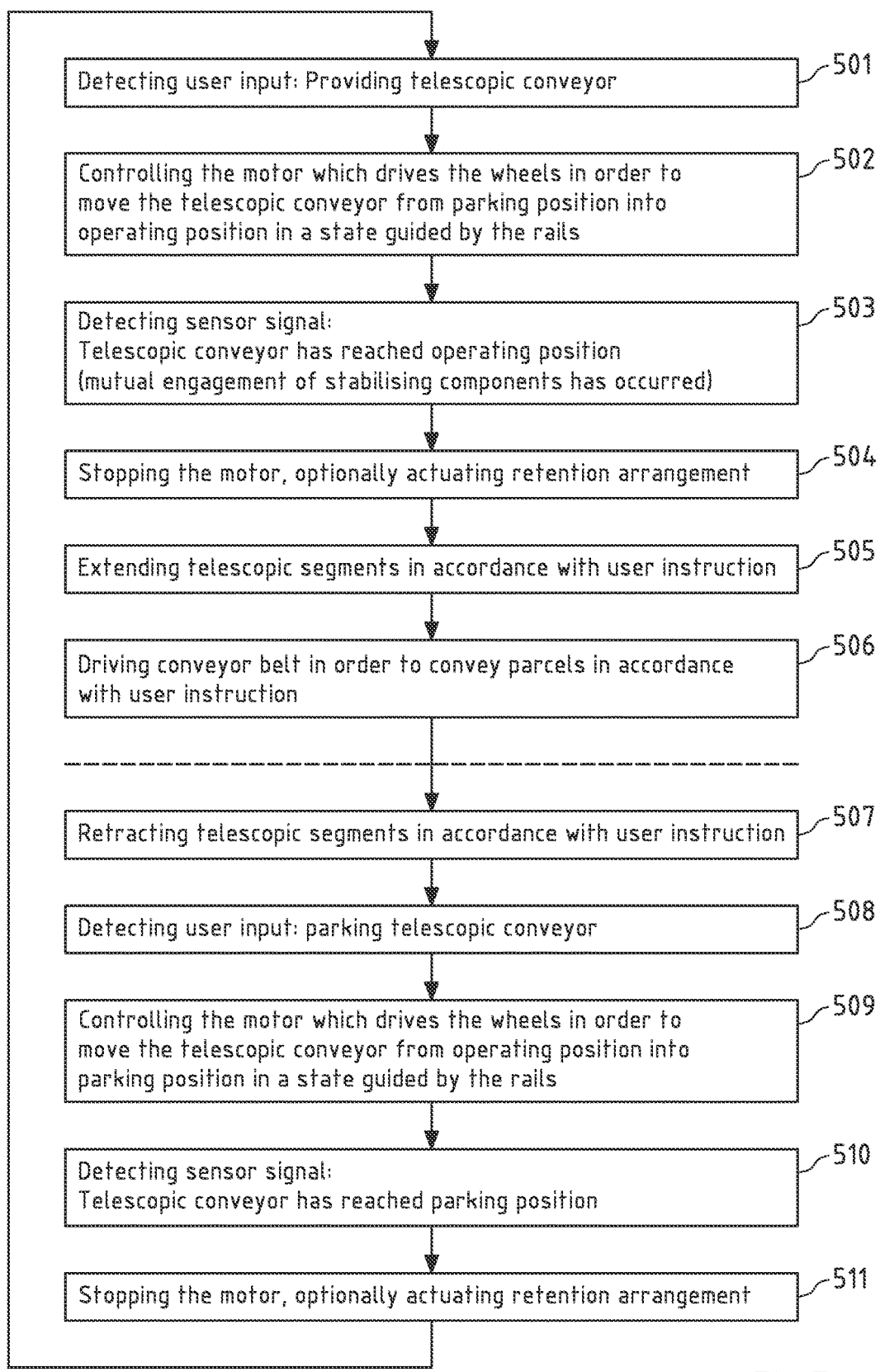
FIG. 5 is a flow chart having method steps of an exemplary embodiment of the method according to the invention.

FIG. 5 is a flow chart which schematically illustrates an operation in the system schematically illustrated in FIGS. 1 to 4 according to an exemplary embodiment of a method according to the invention.

As shown in FIG. 1, the telescopic belt conveyor 20 is first located in the parking position thereof below the roller conveyor 10.

Briefly, the roller conveyor 10 is now intended to supply parcels which are intended to be moved into a trailer. The trailer is already parked in front of the roller conveyor 10, with the access to the loading area in the direction of the removal location of the roller conveyor 10. The telescopic belt conveyor 20 is intended to be used for the transport of the parcels from the roller conveyor 10 to various depths of the trailer.

An operator can now carry out an input at one of the operating elements 27 which is provided for moving the telescopic belt conveyor 20 out of the parking position into the operating position.

The control unit 30 receives a corresponding signal from the operating element 27 and detects the user input therewith (action 501).

Subsequently, the control unit 30 controls the motor 26 which drives wheels 25 of the telescopic belt conveyor 20 in such a manner that the telescopic belt conveyor 20 moves in the conveying direction of the telescopic belt conveyor 20 from the parking position into the operating position (action 502). The wheels 25 are in this instance guided by the guide rails 41, 42.

When the telescopic belt conveyor 20 reaches the operating position, it is stopped and stabilised by the cooperation between the angular member 32 and the spacer 45. The sensor 29 which monitors the torque of the motor 26 determines that the torque exceeds a predetermined limit value and provides a corresponding signal to the control unit 30.

When the control unit 30 receives the signal (action 503), it knows that the telescopic belt conveyor 20 has reached the operating position and brings about a stoppage of the motor 26 (action 504). An undesirable backward movement of the wheels 25 is in this position made more difficult by the threshold 48 which has been passed. In addition, however, a parking brake can also be actuated where applicable or another type of securing can be carried out.

The operator, using the operating elements 27, can now cause the telescopic segments 22, 23, 24 to be extended to a desired length, for example, firstly to the extent that the rear portion of the trailer which is still empty is reached (action 505). The state then corresponds, for example, to the state of the telescopic belt conveyor 20 illustrated in FIG. 3.

For example, in the trailer, using the operating elements 28 at the front of the foremost telescopic segment 24, the operator can now start the conveyor belt 31 of the telescopic belt conveyor 20 so that the parcels delivered by the roller conveyor 10 are conveyed into the trailer by means of the telescopic belt conveyor 20 (action 506). The telescopic belt conveyor 20 with its telescopically adjustable conveying range consequently ensures that parcels do not have to be transported into the trailer by the operator. An operator can receive the parcels from the telescopic belt conveyor 20 and store them at the provided location in the trailer.

During the loading operation, the operator can shorten the length of the telescopic belt conveyor 20 in several steps as the loading volume in the trailer increases by causing a retraction of the telescopic segments 22, 23, 24 by means of the operating elements 28.

If all parcels are loaded, the operator can cause a complete retraction of the telescopic segments 22, 23, 24 by means of the operating elements 28 (action 507).

The actions 505-507 may, for example, also be implemented by means of the control unit 30.

If there are no additional parcels or other unit loads to be conveyed by means of the telescopic belt conveyor 20 in the near future, an operator can now carry out an input at one of the operating elements 27 which is provided for movement of the telescopic belt conveyor 20 out of the operating position back into the parking position.

The control unit 30 receives a corresponding signal from the operating element 27 and detects the user input therewith (action 508).

Subsequently, the control unit controls the motor 26 which drives wheels 25 of the telescopic belt conveyor 20 in such a manner that the telescopic belt conveyor 20 moves counter to the conveying direction of the telescopic belt conveyor 20 from the operating position into the parking position (action 509). The wheels 25 are in this instance guided by the guide rails 41, 42 again.

When the telescopic belt conveyor 20 reaches the parking position, it is stopped when the wheels 25 reach the closure of the grooves of the conveying rails 41, 42. The sensor 29, which monitors the torque of the motor 26, determines that the torque exceeds a predetermined limit value and sends a corresponding signal to the control unit 30.

When the control unit 30 receives the signal (action 510), it thereby knows that the telescopic belt conveyor 20 has reached the parking position and stops the motor 26 (action 511). An undesirable backward movement of the wheels 25 is in this position made more difficult by the threshold 48 which has been passed. In addition, however, a parking brake can also be actuated where applicable or another type of securing can be carried out.

The method illustrated in FIG. 5 can be continued with action 501 as soon as the telescopic belt conveyor 20 is intended to be used again for a loading operation.

Of course, the method can be modified in many respects.

For example, a height adjustment of the end of the telescopic belt conveyor 20 or a pivoting action of the telescopic belt conveyor 20 could further be brought about by the operator, whilst the telescopic belt conveyor 20 is located in the operating position.

Furthermore, a system comprising a telescopic conveyor and guiding elements could be provided for a large number of other applications. Such a system could also be used to supply parcels or other unit loads from the loading area of a lorry or trailer to a conveying arrangement of an installation for further processing, such as sorting for the purposes of delivery.

FIGS. 6 to 11 are schematic illustrations of a second exemplary embodiment of a system according to the invention.

The system again comprises a telescopic belt conveyor 70 and guiding elements which are fitted in a fixed manner below a conveying arrangement 60 of an installation. The conveying arrangement 60 or the entire installation may again optionally be a part of the system. The conveying arrangement 60 may, for example, again be a roller conveyor; however, it may also use any other type of conveying technology, such as, for example, also a conveyor belt.

Figure 6:
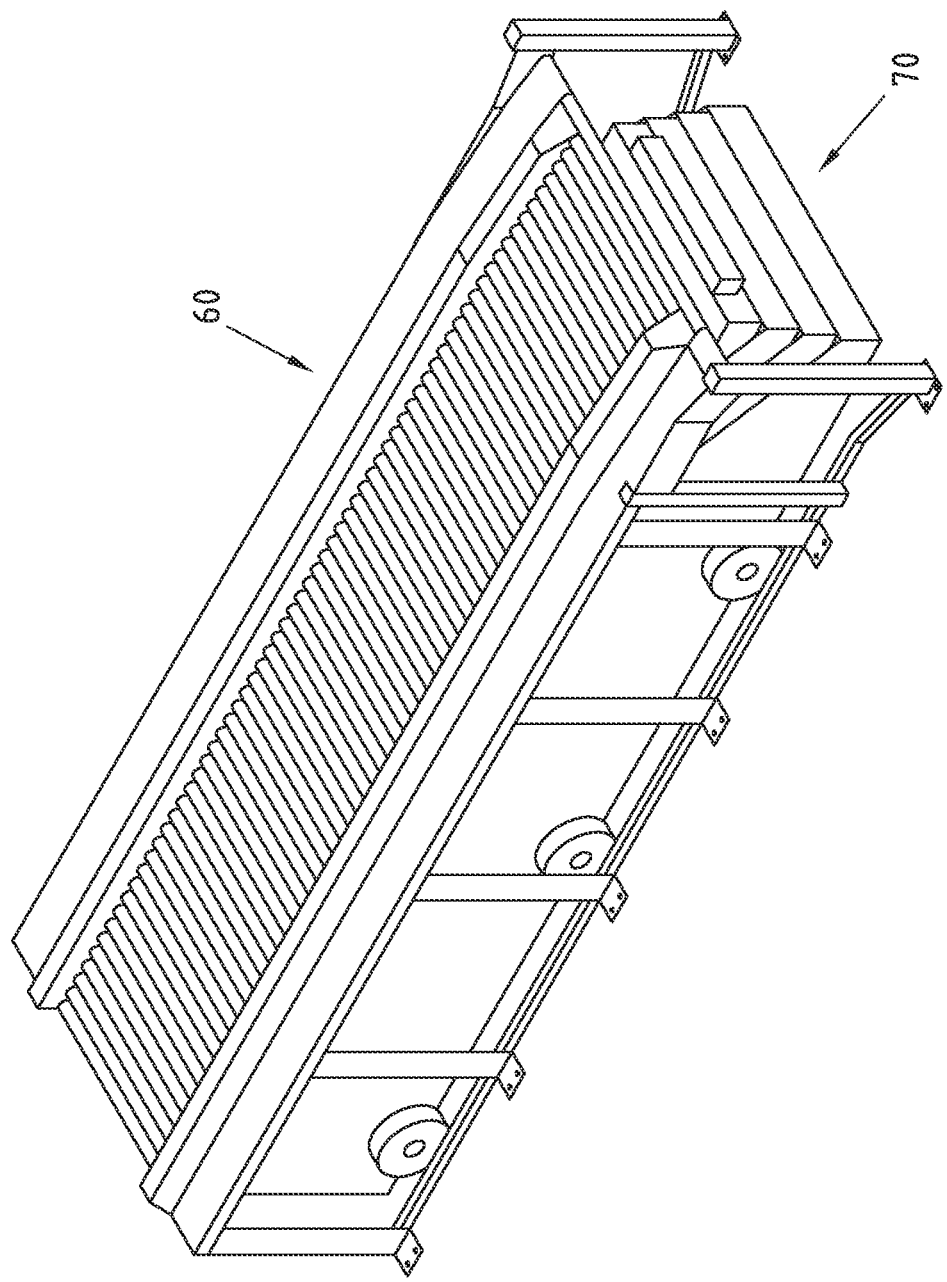
FIG. 6 is a schematic illustration of another exemplary embodiment of a system according to the invention with a telescopic conveyor in a parking position.

In FIG. 6, the telescopic belt conveyor 70 is illustrated in a parking position. The telescopic belt conveyor 70 has wheels and, with guiding by guiding elements, can again be moved back and forth between the parking position and an operating position in front of the conveying arrangement 60. In this instance, however, the telescopic belt conveyor 70 disappears in the parking position completely below the conveying arrangement 60. This may have the effect of leaving a particularly large amount of free space available for other purposes.

Figure 7:
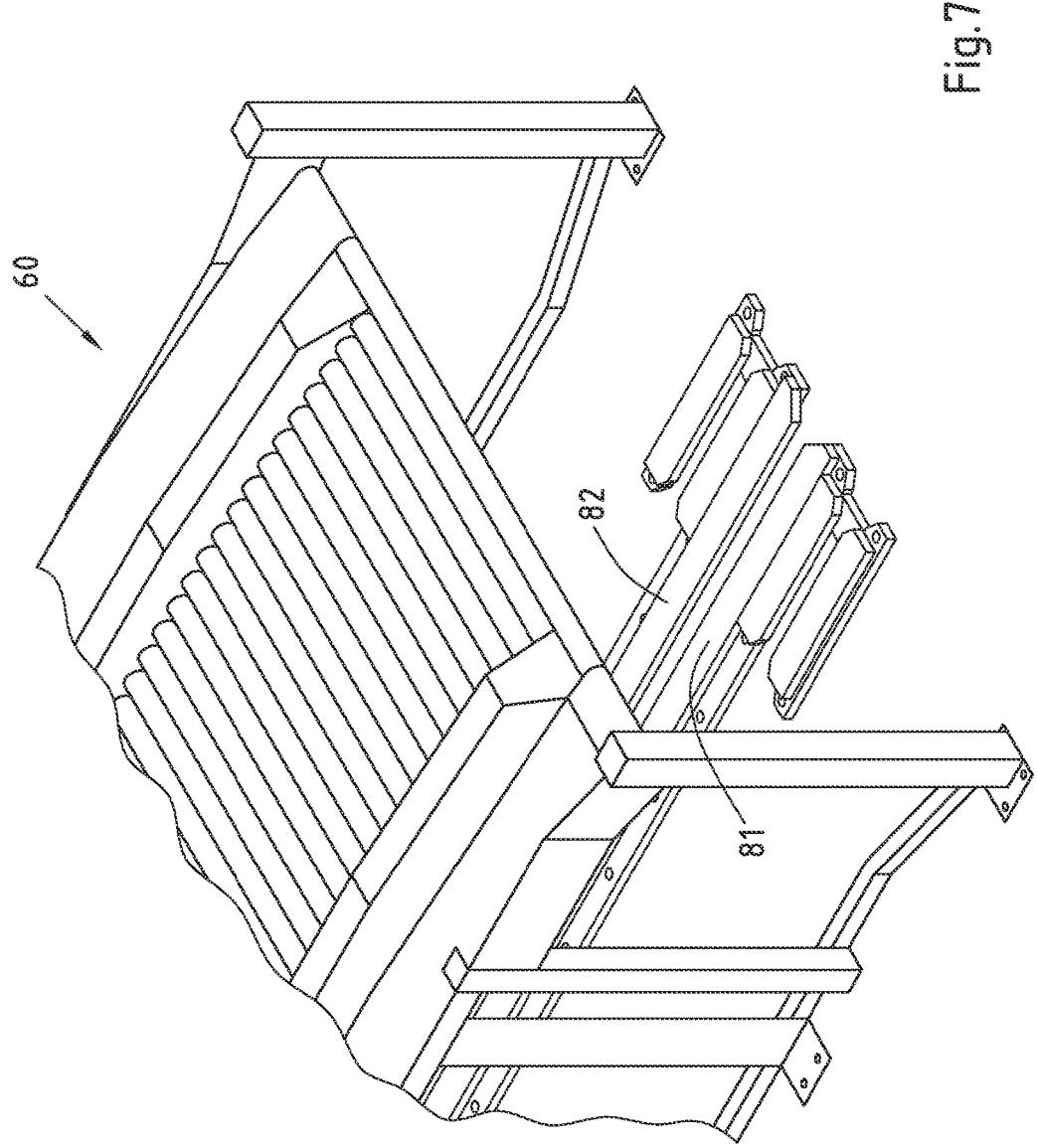
FIG. 7 is a schematic illustration of details with respect to the additional exemplary embodiment.

In FIG. 7, the guiding elements and the arrangement thereof below the conveying arrangement 60 in the second embodiment are illustrated. The guiding elements are in this instance, by way of example, two guide rails 81, 82 which are arranged centrally below the conveying arrangement 60 and which extend substantially parallel with each other in the longitudinal direction of the conveying arrangement 60 and which terminate substantially at the front end of the conveying arrangement 60.

Figure 8:
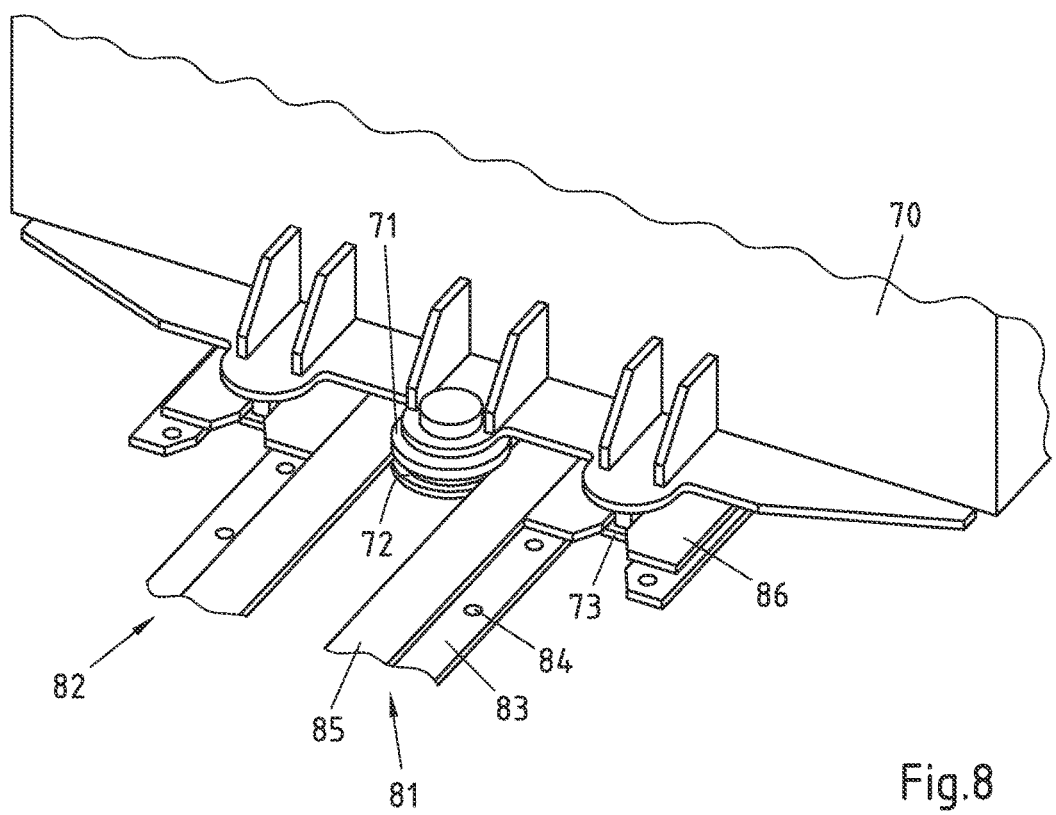
FIG. 8 is another schematic illustration of details relating to the additional exemplary embodiment.

FIG. 8 shows details of the front region of the guide rails 81, 82 and the cooperation thereof with the telescopic conveyor 70.

Each of the rails 81, 82 has in a sectioned view the shape of a double-angled member, a first face 83 of the double-angled member with a free edge constituting a securing component and being secured to the floor, for example, by means of screws. To this end, a plurality of holes 84 may be provided through the first face 83. The second face 85 of the double-angled member with a free edge is thereby located in a plane-parallel manner with respect to the floor with small spacing therefrom and forms the actual guiding member. The free edges of the guiding members 85 of the two guide rails 81, 82 face each other. The guide rails 81, 82 have at their one end shown in FIG. 8 at the sides facing away from each other an outer portion 86 of a respective sliding connection as part of a limitation and/or stabilising arrangement.

The telescopic conveyor 70 has centrally at the rear end a guiding wheel 71 which is arranged horizontally and slightly above the floor. The securing of the guiding wheel 71 and the guiding wheel 71 itself extend the actual telescopic conveyor 70 slightly to the rear, that is to say, they are, for example, secured to a carrier frame of the telescopic conveyor 70. The running face of the guiding wheel 71 is provided all around with a groove 72. The telescopic conveyor 70 further has at the rear end at both sides of the guiding wheel 71 a respective inner portion 73 for one of the sliding connections.

The telescopic conveyor 70 is positioned in such a manner that the guiding wheel 71 is located between the guide rails 81, 82 and the guiding members 85 of the two guide rails 81, 82 engage in the groove 72 from both sides. The spacing of the open edges of the guiding members 85 with respect to each other is in this instance slightly larger than the diameter of the guiding wheel 71 in the region of the groove 72 so that the running face of the guiding wheel 71 on the groove base can always be in contact with only one of the guiding members 85.

The telescopic belt conveyor 70, when moving from the parking position into the operating position and vice versa, is guided in a linear manner by means of the guiding wheel 71 by the rails 81, 82. The parking position is reached when the front end of the telescope belt conveyor 70, as shown in FIG. 6, is substantially at the same height as the front end of the conveying arrangement 60. The operating position is reached when the rear end of the carrier frame of the telescopic conveyor 70 is located directly in front of the front end of the conveying arrangement 60. Since the guiding wheel 71 in comparison with the carrier frame protrudes in a backward direction, it is still just between the rails 81, 82. An unintentional movement of the telescopic belt conveyor 70 beyond the operating position is prevented by the inner portion 73 for the respective sliding connection on the telescopic belt conveyor 70 coming into engagement with the outer portion 86 for the respective sliding connection on the rails 81, 82. The respective outer portion 86 is closed at the side facing away from the conveying arrangement 60 and stops the movement of the telescopic belt conveyor 70 as soon as the inner portion 73 reaches the closed end. At the same time, the sliding connections 73, 86 could stabilise the telescopic belt conveyor 70 during operation by preventing the telescopic belt conveyor 70 from tilting forwards.

If the telescopic belt conveyor 70 is moved into the operating position, the rear end of the telescopic belt conveyor 70 adjoining the conveying arrangement 60 is lower than the front end of the conveying arrangement 60 adjoining the telescopic belt conveyor 70. So that a displacement-free transition between the conveying arrangement 60 and telescopic belt conveyor 70 can be provided for transported unit loads, the conveying arrangement 60 is constructed in such a manner that the front edge of the front end can be lowered.

Figure 9:
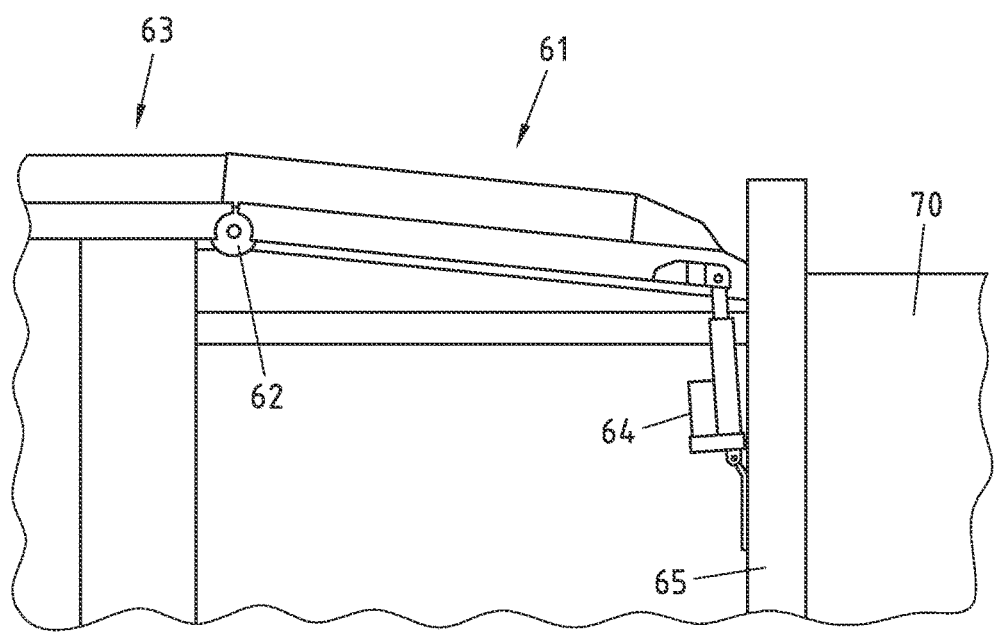
FIG. 9 is another schematic illustration of details relating to the additional exemplary embodiment.

FIG. 9 shows for illustration exemplary details of the conveying arrangement 60 for enabling such a lowering action.

A front region 61 of the conveying arrangement 60 is to this end connected to the rear region 63 of the conveying arrangement 60 by means of a bearing 62. The bearing could comprise simple hinges or, for example, a radial bearing with an axially expanded shaft. The front region 61 is in the region of the front edge thereof further connected to an actuator 64, which can lower and raise the front edge of the front region 61 where applicable. The actuator 64 could be securely mounted on a lateral support 65 of the conveying arrangement 60. The actuator 64 could, for example, comprise a linear motor, such as a hydraulic linear motor.

In the situation illustrated in FIG. 9, the telescopic conveyor 70 is located in the operating position thereof and the front edge of the front region 61 of the conveying arrangement 60 has already been lowered to such an extent that there is a substantially stepless transition between the transport face of the conveying arrangement 60 and transport face of the telescopic conveyor 70.

The low structural height of the telescopic conveyor 70 which first enables the telescopic conveyor 70 to be stored below the conveying arrangement 60, additionally has the effect that the front end, at which the operators are carrying out a loading or unloading operation of the telescopic conveyor 70, has an uncomfortably low operating height.

Figure 10:
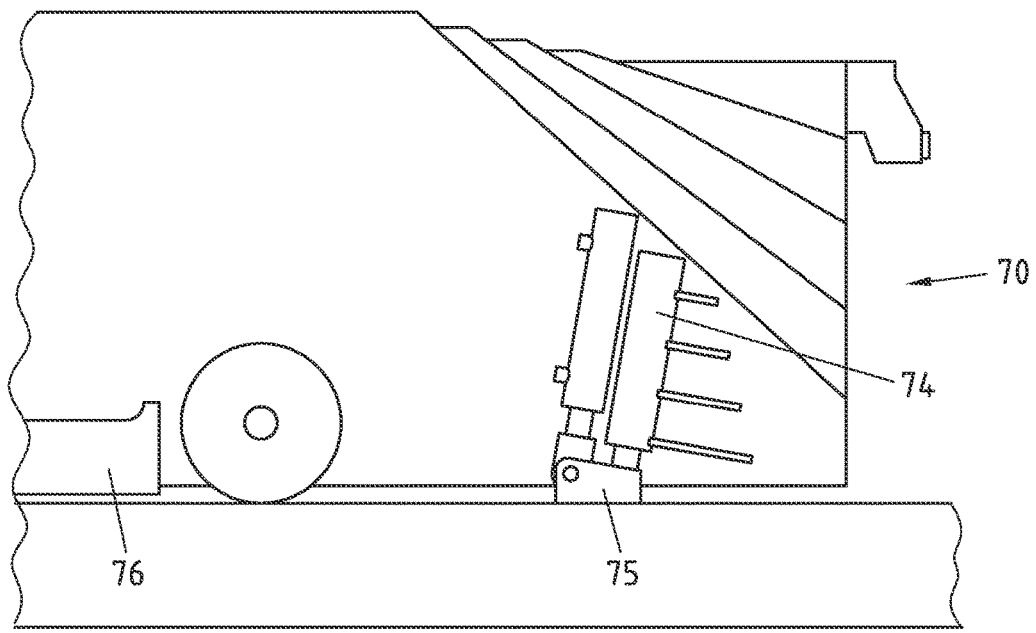
FIG. 10 is another schematic illustration of details relating to the additional exemplary embodiment.
Figure 11:
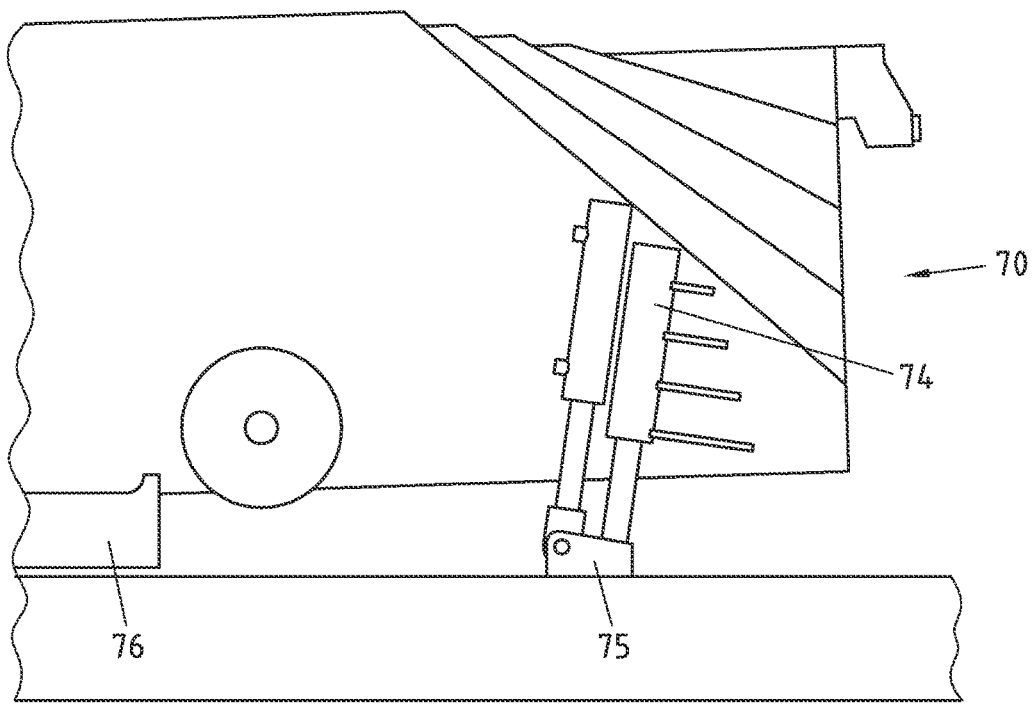
FIG. 11 is another schematic illustration of details relating to the additional exemplary embodiment.

FIGS. 10 and 11 schematically show an approach for bringing the front end of the telescopic conveyor 70 opposite the conveying arrangement 60 to an ergonomically advantageous height for operation. Both Figures show the front end of the telescopic conveyor 70. The telescopic conveyor 70 is located in an operating position, but the telescopic segments are (still) retracted.

Two hydraulic cylinders 74 are mounted on a side wall of the carrier frame of the telescopic conveyor 70. Such hydraulic cylinders 74 could be fitted only to one side or symmetrically at both sides of the telescopic conveyor 70.

In FIG. 10, the hydraulic cylinders 74 are in a first state in which the pistons are each located completely in the associated cylinders. The surface of the telescopic conveyor 70 extends in this state substantially horizontally at a continuously low height. The lower end of the hydraulic cylinders 74 is connected to a support element 75 which in this state has a small spacing with respect to the floor so that it does not impede the telescopic conveyor 70 when moving between a parking position and an operating position.

In FIG. 11, the hydraulic cylinders 74 are located in a second state in which the pistons have each been deployed from the associated cylinders to the maximum extent. The surface of the telescopic conveyor 70 extends in this state upwards from the rear end facing the conveying arrangement 60 to the opposing front end. A first, short deployment length serves to bring the support element 75 into contact with the floor. As soon as the contact with the floor is present, the further deployment serves to raise the front end of the telescopic conveyor 70. Of course, the height of the raising action may be variable. It is thus possible, for example, in different extension situations of the telescopic segments of the telescopic conveyor 70 to always achieve a uniform ergonomically advantageous height at the end of the telescopic conveyor 70. The deployment height of the hydraulic cylinders 74 could in example embodiments also automatically be coupled to the respective extension length of the telescopic conveyor 70.

The angle of the hydraulic cylinders 74 is selected in such a manner that the front end of the telescopic conveyor 70 is raised without the height of the rear end of the telescopic conveyor 70 being substantially changed so that the latter remains at the height of the conveying arrangement 60. To this end, the telescopic conveyor 70 could also have a frame portion 76 in which the remaining portion of the telescopic conveyor 70 is supported so as to be able to be tilted but which is itself not moved by the hydraulic cylinders 74. The securing components for the guiding wheel 71 and for the inner portions 73 for the sliding connections could then be fitted to the frame portion 76 of the telescopic conveyor 70 so that the frame portion 76, the guiding wheel 71 and the inner portions 73 regardless of the operating state of the hydraulic cylinders 74 can always substantially have the same angle with respect to the ground. The frame portion 76 could in this instance be considered to be a part of a carrier frame of the telescopic conveyor 70 or an additional element.

Alternatively to the approaches from FIGS. 9 to 11, the entire telescopic conveyor 70 could also be raised in the operating position, for example, hydraulically, in order to achieve both correspondence with the level of the conveying arrangement 60 and an ergonomically advantageous operating height. This could afford the advantage that the conveying arrangement 60 does not need to be adapted. Also in this alternative, a guiding of the telescopic conveyor 70 between a parking position and an operating position could be employed in a similar manner as in the exemplary embodiment illustrated in FIG. 8. The telescopic conveyor 70 could then have a frame which is not affected by the height adjustment and inside which the remainder of the telescopic conveyor 70 is lifted. The securing components for the guiding wheel 71 and for the inner portions 73 for the sliding connections could then be fitted to this frame portion of the telescopic conveyor 70.

There may be provision for the telescopic belt conveyor 70 to be moved by the operator manually between the parking position and the non-illustrated operating position. A separate motor, operating elements and a control unit for moving the telescopic belt conveyor 70 between the positions would not be necessary in this instance. However, it is self-evident that also for the telescopic belt conveyor 70, there may be provision for a motor-driven movement between the positions.

In other exemplary embodiments, an operating position defined by at least one guiding element directly in front of a conveying arrangement may be only one of many possible operating positions. Where applicable, a telescopic belt conveyor in these embodiments may also be moved to other operating positions which are independent of the at least one guiding element and the conveying arrangement.

The connections illustrated or described between components are intended to be understood to be functional connections. They may be realised directly or indirectly by means of a plurality of other components. The sequence of the actions set out in the flow chart is not compulsory; alternative sequences of the method steps are conceivable. The actions may be implemented in different manners.

It is self-evident that the embodiments described are only examples which can be modified and/or supplemented in many ways within the scope of the claims. In particular, each feature which has been described for a specific embodiment can be used independently or in combination with other features in any other embodiment. Each feature which has been described for an embodiment of a specific category can also be used accordingly in an embodiment of another category.

The invention claimed is:

1. System comprising a locally fixed conveyor of a fixed installation, a telescopic conveyor that is separate from the locally fixed conveyor, and at least one guiding element, wherein the telescopic conveyor includes a carrier frame and a plurality of telescopic segments movable relative to said carrier frame, and wherein the telescopic conveyor includes a continuous belt extending over the carrier frame and each one of said plurality of telescopic segments,
wherein the telescopic conveyor and the at least one guiding element are configured to cooperate with each other in such a manner that the telescopic conveyor is movable, guided by the at least one guiding element, in and/or counter to the conveying direction of the telescopic conveyor between a parking position and an operating position of the telescopic conveyor, and
wherein the at least one guiding element comprises securing components which fix the at least one guiding element at a location below the locally fixed conveyor in such a manner that the telescopic conveyor, for reaching its parking position, is moveable as a whole to be located at least for the most part below the locally fixed conveyor.

2. System according to claim 1, wherein the telescopic conveyor comprises wheels and wherein the at least one guiding element comprises at least one rail for guiding the telescopic conveyor.

3. System according to claim 1, wherein the telescopic conveyor comprises a guiding wheel which can be guided by the at least one guiding element and which
is arranged in a rear region of the telescopic conveyor and/or
is arranged centrally relative to the telescopic conveyor and/or
is orientated horizontally and/or
is guided between two rails which act as the at least one guiding element.

4. System according to claim 1, wherein the telescopic conveyor comprises means for height adjustment of a front end of the telescopic conveyor, with a height of a rear end of the telescopic conveyor being maintained.

5. System according to claim 1, wherein the telescopic conveyor comprises wheels and at least one motor for driving at least one of the wheels and wherein the system comprises at least one control unit which is configured to control the at least one motor in response to a user input.

6. System according to claim 1, which further comprises at least one component for mechanical limitation of the movement of the telescopic conveyor beyond the parking position and/or the operating position.

7. System according to claim 1, which further comprises at least one sensor which is arranged to detect that the parking position and/or the operating position of the telescopic conveyor has been reached.

8. System according to claim 1, which further comprises at least one retention arrangement for retaining the telescopic conveyor in the parking position and/or in the operating position of the telescopic conveyor.

9. System according to claim 1, wherein the telescopic conveyor and the at least one guiding element comprise cooperating stabilising components for stabilising the telescopic conveyor when the telescopic conveyor is operated in an operating position.

10. System according to claim 1, wherein the at least one guiding element comprises at least one rail which is fixed centrally below the conveying arrangement and which extends along the conveying direction of the conveying arrangement.

11. System according to claim 1, wherein the telescopic conveyor is located in the operating position thereof at least for the most part in front of the conveying arrangement, wherein the conveying arrangement has a first conveying height which is higher than a conveying height of the telescopic conveyor in the operating position thereof in a region adjoining the conveying arrangement, and wherein the conveying arrangement has a front end which can be lowered to a second conveying height which corresponds to the conveying height of the telescopic conveyor in the region adjoining the conveying arrangement.

12. System according to claim 11, wherein the conveying arrangement comprises at least one actuator and wherein the front end of the conveying arrangement can be lowered to the second conveying height by means of the actuator.

13. System according to claim 1, wherein
the fixed installation is a sorting installation and/or
the fixed installation is an encoding installation, and/or
the locally fixed conveyor comprises a supply arrangement.

14. Method for using a system, wherein the system comprises a locally fixed conveyor of a fixed installation, a telescopic conveyor that is provided in addition to the locally fixed conveyor, and at least one guiding element, the method comprising:
moving the telescopic conveyor as a whole in or counter to the conveying direction of the telescopic conveyor from a parking position into an operating position with the telescopic conveyor being guided by the at least one guiding element in order to enable operation of the telescopic conveyor, and/or
moving the telescopic conveyor as a whole in or counter to the conveying direction of the telescopic conveyor from an operating position into a parking position with the telescopic conveyor being guided by the at least one guiding element, wherein the telescopic conveyor includes a carrier frame and a plurality of telescopic segments movable relative to said carrier frame, and wherein the telescopic conveyor includes a continuous belt extending over the carrier frame and each one of said plurality of telescopic segments;
wherein the at least one guiding element comprises securing components which fix the at least one guiding element at a location below the locally fixed conveyor in such a manner that the telescopic conveyor, in its parking position, is located at least for the most part below the locally fixed conveyor.

15. System according to claim 1, wherein the locally fixed conveyor of the fixed installation comprises lateral supports fixed to ground.

16. System according to claim 1, wherein the locally fixed conveyor of the fixed installation comprises lateral supports and wherein the at least one guiding element is secured to the lateral supports.

17. Method according to claim 14, wherein the locally fixed conveyor of the fixed installation comprises lateral supports fixed to ground.

18. Method according to claim 14, wherein the locally fixed conveyor of the fixed installation comprises lateral supports and wherein the at least one guiding element is secured to the lateral supports.

\* \* \* \* \*